US010017130B2

(12) United States Patent
Knieper (10) Patent No.: US 10,017,130 B2
(45) Date of Patent: Jul. 10, 2018

(54) RETAINER TO SECURE FASTENER OF DOOR TRIM PANEL

(71) Applicant: Toyota Boshoku America, Inc., Novi, MI (US)

(72) Inventor: David Joseph Knieper, Brighton, MI (US)

(73) Assignee: Toyota Boshoku America, Inc., Novi, MI (US)

( * ) Notice: Subject to any disclaimer, the term of this patent is extended or adjusted under 35 U.S.C. 154(b) by 0 days.

(21) Appl. No.: 15/205,327

(22) Filed: Jul. 8, 2016

(65) Prior Publication Data

US 2017/0050584 A1    Feb. 23, 2017

Related U.S. Application Data

(60) Provisional application No. 62/206,880, filed on Aug. 19, 2015.

(51) Int. Cl.
*B60R 13/02* (2006.01)
*F16B 5/06* (2006.01)

(52) U.S. Cl.
CPC ...... *B60R 13/0206* (2013.01); *B60R 13/0243* (2013.01); *F16B 5/0657* (2013.01)

(58) Field of Classification Search
CPC . B60R 13/02; B60R 13/0206; B60R 13/0237; B60R 13/0243; B60R 13/025; B60R 13/04; F16B 5/0657
See application file for complete search history.

(56) References Cited

U.S. PATENT DOCUMENTS

| | | | |
|---|---|---|---|
| 6,196,607 B1 * | 3/2001 | Gulisano | B60R 13/01 293/115 |
| 6,594,870 B1 * | 7/2003 | Lambrecht | F16B 5/0628 24/297 |
| 7,954,205 B2 | 6/2011 | Xueyong et al. | |
| 8,613,414 B2 | 12/2013 | Rosemann et al. | |

(Continued)

FOREIGN PATENT DOCUMENTS

| | | |
|---|---|---|
| EP | 2833004 A1 | 2/2015 |
| JP | 2015-34606 | 2/2015 |
| JP | 2015-85846 | 5/2015 |

OTHER PUBLICATIONS

International Search Report and Written Opinion for International Application No. PCT/US2016/041475 dated Oct. 10, 2016.

(Continued)

*Primary Examiner* — Gregory A Blankenship
(74) *Attorney, Agent, or Firm* — Carlson, Gaskey & Olds P.C.

(57) ABSTRACT

An assembly include a door trim panel including an interior surface and a tower projecting from the interior surface. The tower includes an opening accessible by a slot, an attachment feature including a flexible arm, and a rib. The rib is integrally molded to a surface of the flexible arm to define a single unitary component. A fastener has a first base, a second base, a stem located between the first base and the second base, and a head. The stem of the fastener is located in the opening, the second base is retained by the attachment feature, and the first base and the head of the fastener are located outside the tower.

14 Claims, 8 Drawing Sheets

(56) References Cited

U.S. PATENT DOCUMENTS

| | | |
|---|---|---|
| 8,944,733 B2 | 2/2015 | Podsadny et al. |
| 8,979,156 B2 | 3/2015 | Mally |
| 2001/0042273 A1 | 11/2001 | Chaffee |
| 2004/0184896 A1 | 9/2004 | Tanner |
| 2006/0197356 A1* | 9/2006 | Catron .................. B60J 5/0468 296/146.7 |
| 2007/0107174 A1* | 5/2007 | Bordas ............... B60R 13/0206 24/664 |
| 2009/0019674 A1* | 1/2009 | Sato ................... B60R 13/0206 24/289 |
| 2009/0064467 A1* | 3/2009 | Xueyong ............ B60R 13/0206 24/292 |
| 2009/0205174 A1* | 8/2009 | Slobodecki ......... B60R 13/0206 24/458 |
| 2011/0035909 A1* | 2/2011 | Moberg ................ B60J 5/0468 24/289 |
| 2011/0119875 A1 | 5/2011 | Iwasaki |
| 2011/0142535 A1* | 6/2011 | Molnar ............... B29C 45/4435 403/220 |
| 2013/0305653 A1 | 11/2013 | Ishizu et al. |
| 2014/0284962 A1* | 9/2014 | Mally ................... F16B 5/0657 296/146.7 |
| 2015/0113773 A1* | 4/2015 | Iwahara ............. B60R 13/0206 24/594.11 |
| 2015/0174740 A1* | 6/2015 | Morris .................... B25B 11/02 29/559 |
| 2016/0368433 A1* | 12/2016 | Vega Velazquez . B60R 13/0206 |
| 2017/0050584 A1* | 2/2017 | Knieper ............. B60R 13/0206 |
| 2017/0113629 A1* | 4/2017 | Dickinson .......... B60R 13/0206 |

OTHER PUBLICATIONS

International Preliminary Report on Patentability for PCT Application No. PCT/US 2016/041475 dated Nov. 15, 2017.

* cited by examiner

RETAINER TO SECURE FASTENER OF DOOR TRIM PANEL

REFERENCE TO RELATED APPLICATIONS

This application claims priority to U.S. Provisional Application No. 62/206,880 filed on Aug. 19, 2015.

BACKGROUND OF THE INVENTION

Figure 1:
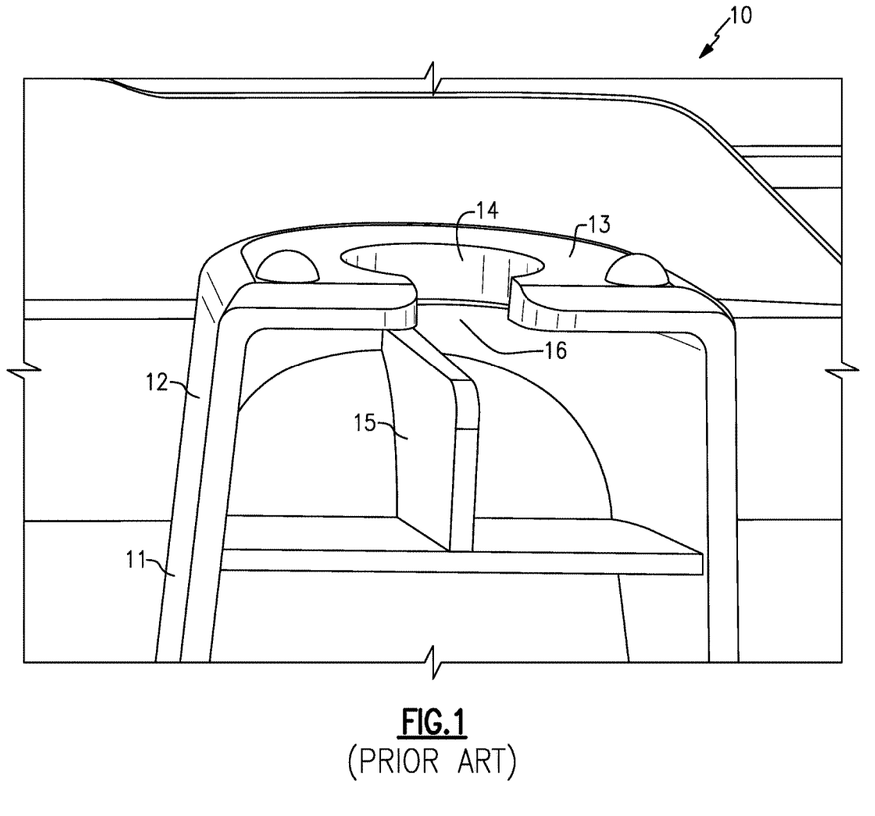
FIG. 1 illustrates a front view prior art door trim panel.

A fastener, such as a clip, attaches a plastic door trim panel to sheet metal. As shown in FIG. 1, the door trim panel 10 includes at least one tower 12 that has an opening 14 accessible by a slot 16. The tower 12 includes a body 11 and a planar surface 13. A rib 15 is located within the tower 12 below the opening 14 and the planar surface 13. A stem of a fastener (not shown) can be slid through the slot 16 and into the opening 14 such that a base of the fastener is located between the rib 15 and the planar surface 13 of the tower 12. The fastener can then be used to attach the door trim panel 10 to sheet metal (not shown). However, the fastener is not positively secured into the opening 14 and can fall out during assembly.

SUMMARY OF THE INVENTION

In a featured embodiment, an assembly includes a door trim panel including an interior surface and a tower projecting from the interior surface. The tower includes an opening accessible by a slot, an attachment feature including a flexible arm, and a rib. The rib is integrally molded to a surface of the flexible arm to define a single unitary component. A fastener has a first base, a second base, a stem located between the first base and the second base, and a head. The stem of the fastener is located in the opening, the second base is retained by the attachment feature, and the first base and the head of the fastener are located outside the tower.

In another embodiment according to the previous embodiment, the tower includes an upper panel and walls projecting from an interior surface to the upper panel. The upper panel includes the opening and the slot.

In another embodiment according to any of the previous embodiments, the tower includes another rib located between and attached to the walls of the tower. The rib is located between the upper panel and the another rib. The another rib is substantially perpendicular to the rib.

In another embodiment according to any of the previous embodiments, the another rib extends from the interior surface of the door trim panel to the flexible arm. The another rib is substantially perpendicular to the rib.

In another embodiment according to any of the previous embodiments, the attachment feature includes a tab portion that retains the second base of the fastener, and an angled recess is defined between the flexible arm and the tab portion.

In another embodiment according to any of the previous embodiments, a length of the rib and a contact area of the rib with the flexible arm determines a flexibility of the flexible arm.

In another embodiment according to any of the previous embodiments, a panel is attached to the head of the fastener to secure the door trim panel to the panel.

In another embodiment according to any of the previous embodiments, the tab is integrally molded to an under surface of the flexible arm.

In another featured embodiment, an assembly includes a door trim panel including an interior surface and a tower projecting from the interior surface. The tower includes an upper panel having an opening accessible by a slot. Walls are projected from the interior surface to the upper panel. An attachment feature includes a flexible arm, a tab portion and an angled recess defined between the flexible arm and the tab portion, and a rib. The rib is integrally molded to a surface of the flexible arm to define a single unitary component, and a length of the rib and a contact area of the rib with the flexible arm determines a flexibility of the flexible arm. A fastener has a first base, a second base, a stem located between the first base and the second base, and a head. The stem of the fastener is located in the opening. The second base is retained by the tab portion of the attachment feature. The first base and the head of the fastener are located outside the tower. A panel is attached to the head of the fastener to secure the door trim panel to the panel.

In another embodiment according to the previous embodiment, the tower includes another rib located between and attached to the walls of the tower. The rib is located between the upper panel and the another rib. The another rib is substantially perpendicular to the rib.

In another embodiment according to any of the previous embodiments, the another rib extends from the interior surface of the door trim panel to the flexible arm. The another rib is substantially perpendicular to the rib.

In another embodiment according to any of the previous embodiments, the tab is integrally molded to an under surface of the flexible arm.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENTS

Figure 2:
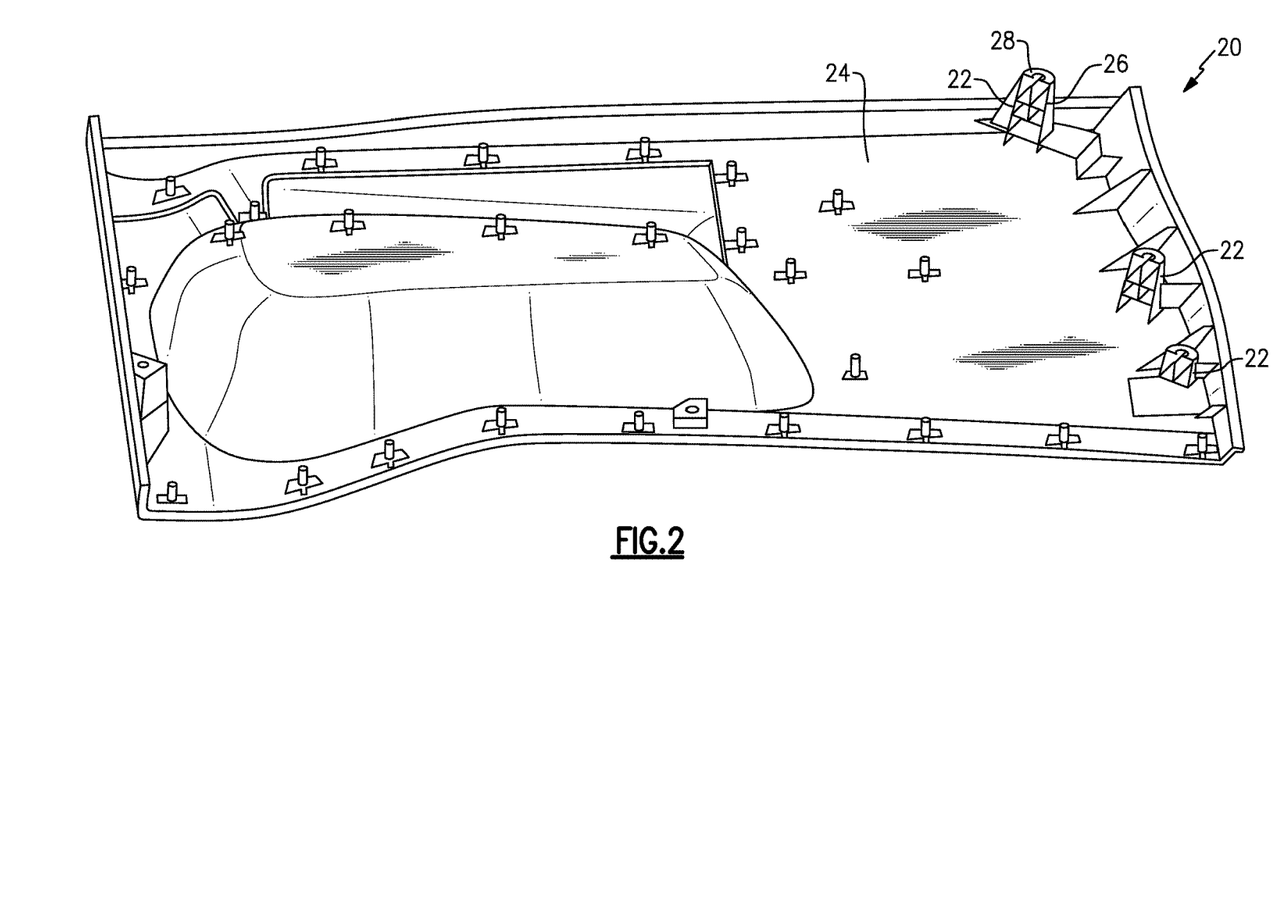
FIG. 2 illustrates an interior view of a typical door trim panel of a vehicle door.
Figure 3:
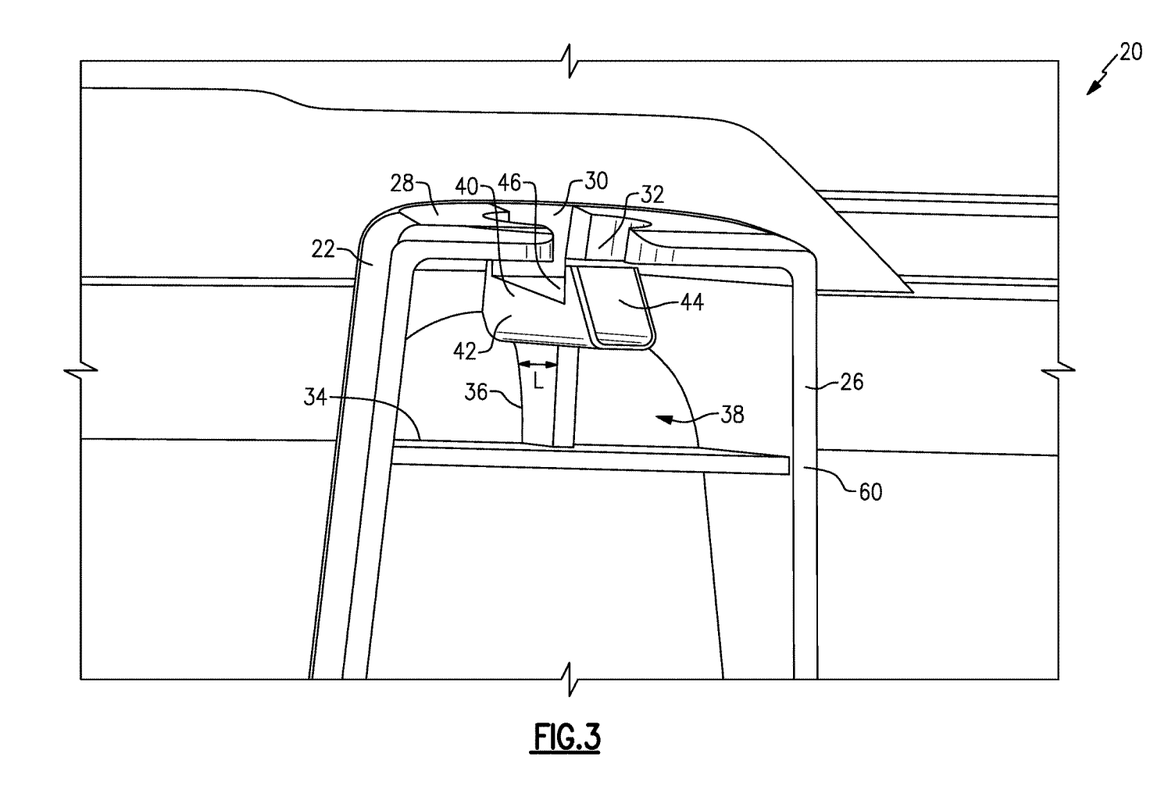
FIG. 3 illustrates a front perspective view of the door trim panel with a locking mechanism.
Figure 4:
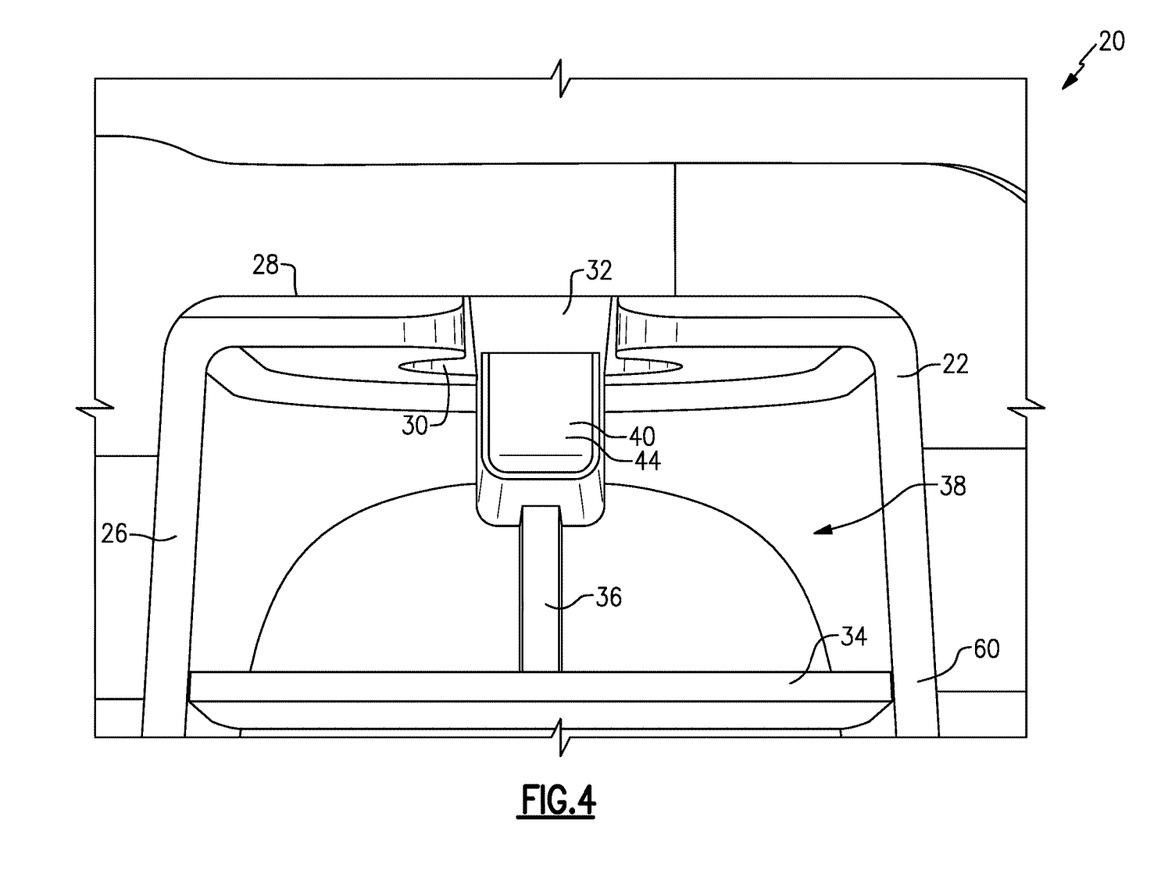
FIG. 4 illustrates a front view of the door trim panel with the locking mechanism.
Figure 5:
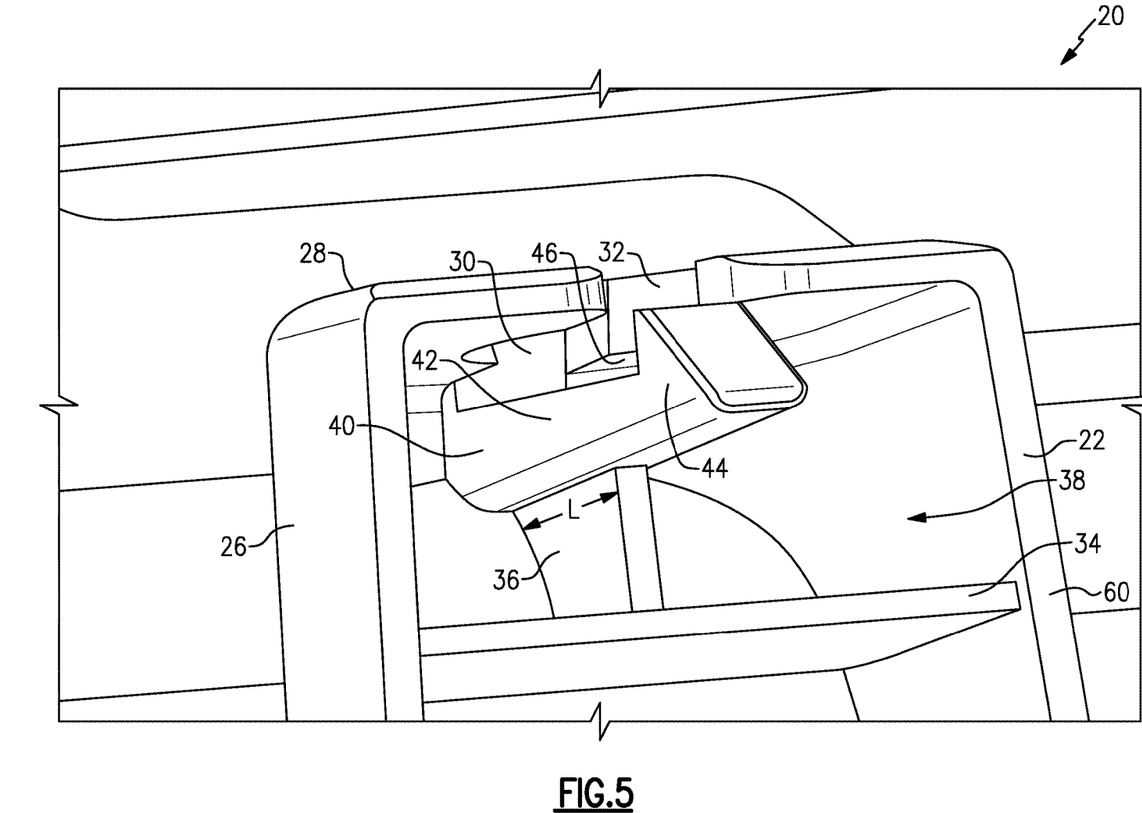
FIG. 5 illustrates a perspective view of the door trim panel with the locking mechanism.
Figure 6:
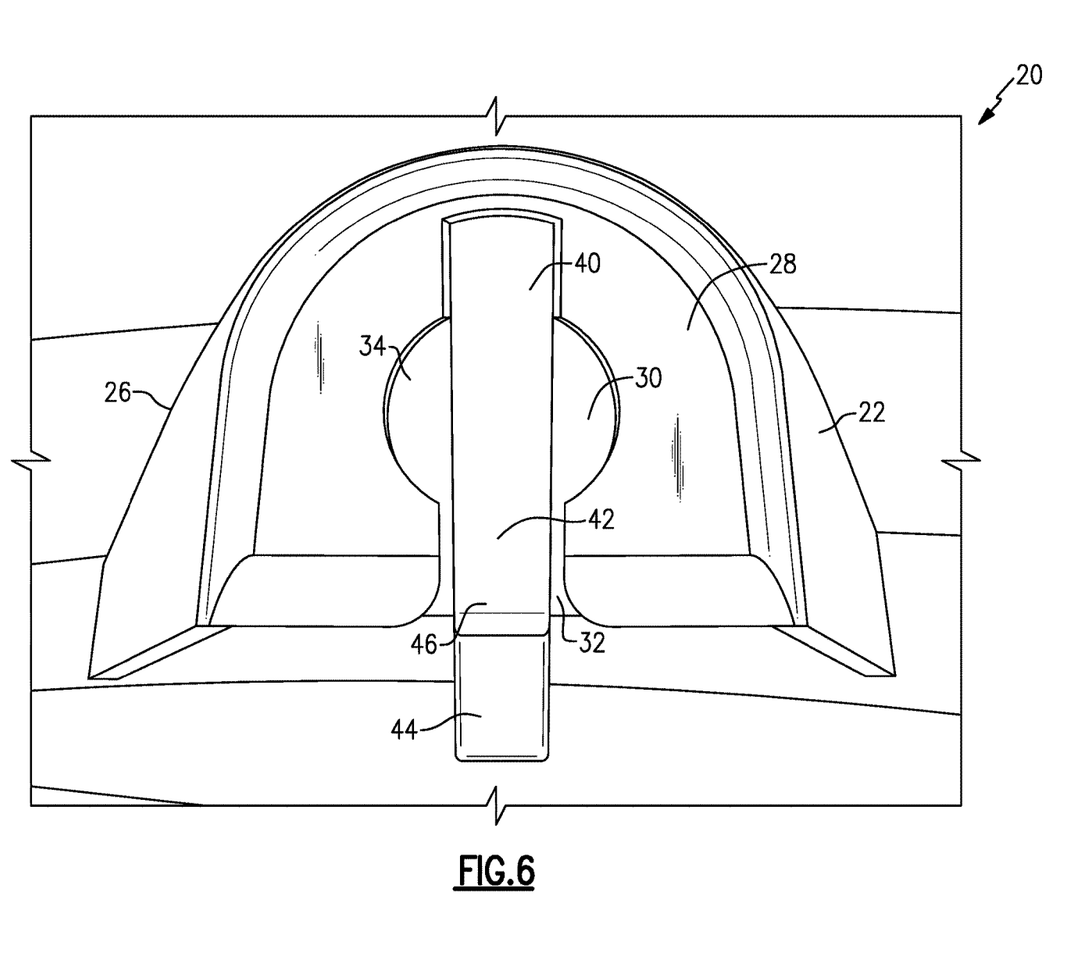
FIG. 6 illustrates an upper view of the door trim panel with the locking mechanism.

FIG. 2 illustrates an interior view of a door trim panel 20 of a vehicle door. The door trim panel 20 includes a plurality of dog house towers 22 that extend upwardly from an interior surface 24 of the door trim panel 20. In one example, the door trim panel 20 is made of plastic or resin.

FIGS. 3 to 6 illustrate the dog house towers 22 of the door trim panel 20. The dog house towers 22 includes a body 26 and an upper planar surface 28. The upper planar surface 28 has an opening 30 and a slot 32 that is in communication with the opening 30 and a space outside the dog house towers 22.

In one example, the dog house tower 22 includes a first rib 34 that is located between two walls 60 of the dog house tower 22, and the first rib 34 is also substantially parallel to the upper planar surface 28. The dog house tower 22 also includes a second rib 36 that is substantially perpendicular to the first rib 34 and attached to the first rib 34. A space 38 is defined between the upper planar surface 28 and the first rib 34. In another example, the dog house tower 22 does not include a first rib 34, and the second rib 36 extends along the height of the dog house tower 22 from the interior surface 24 to an attachment feature 40.

The attachment feature 40 is located in the space 38. The attachment feature 40 including a flexible arm 42 and a tab 44 having a ramped surface that defines a hook. A recess 46 is defined between the flexible arm 42 and the tab 44. In one example, the recess 46 is substantially v-shaped. In one example, the attachment feature 40 is integrally molded with the dog house tower 22 to form a single unitary piece. The attachment feature 40 is attached to the second rib 36 and molded together in a single unitary piece. For example, the second rib 36 is attached to an underside of the attachment feature 40.

The flexibility of the attachment feature 40 is dependent on a length of the second rib 36 at the point of attachment with the flexible arm 42. If the second rib 36 is longer and has a greater area of attachment with the flexible arm 42, the second rib 36 limits deflection of the flexible arm 42 increasing stiffness. If the second rib 36 is shorter and has a smaller area of attachment with the flexible arm 42, more deflection of the flexible arm 42 is possible. Therefore, the length of the second rib 36 can be customized to provide a specific deflection of the flexible arm 42. The second rib 36 provides support for the flexible arm 36 during installation of a fastener 48 to sheet metal, plastic or other materials.

Figure 7:
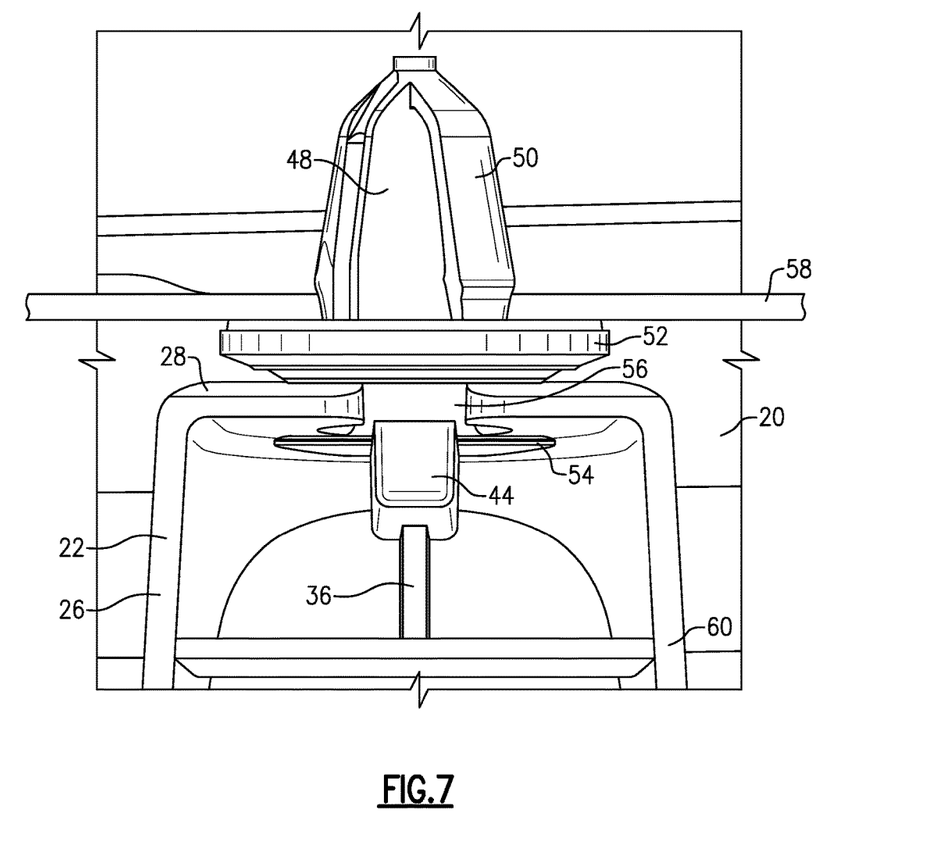
FIG. 7 illustrates a front view of the door trim panel and a fastener.
Figure 8:
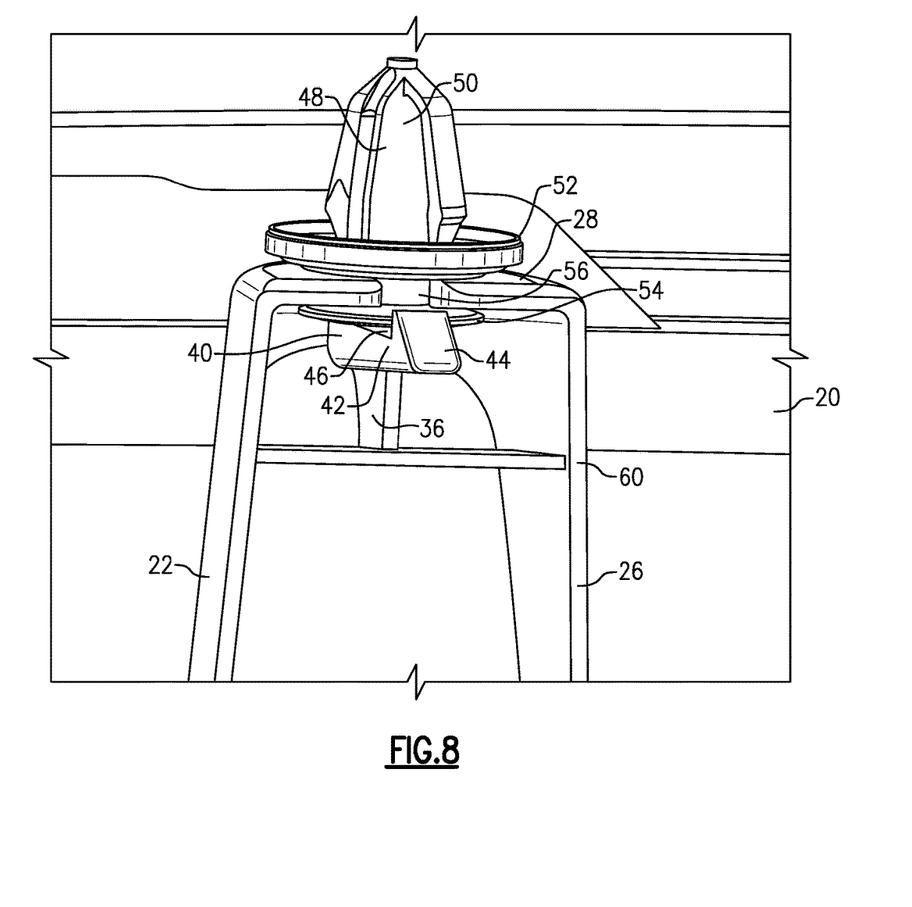
FIG. 8 illustrates a perspective view of the door trim panel and the fastener.

FIGS. 7 and 8 illustrate a fastener 48, or door clip, that is attached to the door trim panel 20. The fastener 48 includes a head 50, a first base 52, a second base 54, and a stem 56 located between the first base 52 and the second base 54. In one example, the fastener 48 is made of plastic.

When attaching the fastener 48 to the door trim panel 20, the second base 54 of the fastener 48 is positioned in the space 38 between the upper planar surface 28 of the tower 22 and the first rib 34 and above the flexible arm 42. As the second base 54 moves into the space 38, the second base 54 presses on the flexible arm 42, causing the flexible arm 42 to move away from the upper planar surface 28 and from an initial position. The stem 56 also travels through the slot 32.

Once the second base 54 is fully inserted into the space 38, the flexible arm 42 biases back to the initial position, and at least a portion of the second base 54 is located in the recess 46 and between the flexible arm 42 and the upper planar surface 28. In this position, the stem 56 of the fastener 48 is located in the opening 30 of the dog house tower 22, and the first base 52 is located outside the tower 22.

The attachment feature 40 of the dog house tower 22 secures the second base 54 and therefore the fastener 48 to the tower 22. This prevents the fastener 48 from accidentally being removed from or falling out of the tower 22. Once the fastener 48 is attached by the flexible arm 42, the tab 44 securely retains the fastener 48 to the door trim panel 20 and provides a positive hold, preventing the fastener 48 from falling out. Finally, the door trim panel 20 is attached to the fastener 48, and the head 50 of the fastener 48 is then secured to a panel 58. In one example, the panel 58 is sheet metal.

If the fastener 48 is to be removed, the tab 44 can be pressed in a direction away from the upper planar surface 28 to move the flexible arm 42 away from the upper planar surface 28. The movement of the tab 44 allows the fastener 48 to be slid through the slot 32 and removed from the dog house tower 22. The fastener 48 can be installed and removed from the dog house tower 22 as many times as needed.

Although a door trim panel 20 has been illustrated and described, the attachment feature 40 can be used in other applications. For example, the attachment feature 40 can be employed as part of a seat trim part, any interior part, or any exterior part.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An assembly comprising:
   a door trim panel including an interior surface and a tower projecting from the interior surface, wherein the tower includes an upper panel and parallel walls projecting from the interior surface to the upper panel, an opening accessible by a slot, an attachment feature including a flexible arm, and a rib, wherein the rib is integrally molded to a surface of the flexible arm to define a single unitary component, the rib is located between the parallel walls of the tower, and the upper panel includes the opening and the slot, and the rib is not coplanar with an end of each of the parallel walls; and
   a fastener having a first base, a second base, a stem located between the first base and the second base, and a head, wherein the stem of the fastener is located in the opening, the second base is retained by the attachment feature, and the first base and the head of the fastener are located outside the tower.

2. The assembly as recited in claim 1 wherein the attachment feature includes a tab portion that retains the second base of the fastener, and an angled recess is defined between the flexible arm and the tab portion.

3. The assembly as recited in claim 1 wherein a length of the rib and a contact area of the rib with the flexible arm determines a flexibility of the flexible arm.

4. The assembly as recited in claim 1 wherein a panel is attached to the head of the fastener to secure the door trim panel to a panel.

5. The assembly as recited in claim 1 wherein the tab is integrally molded to an under surface of the flexible arm.

6. The assembly as recited in claim 1 wherein the rib is located in a space defined by the parallel walls and the upper panel.

7. An assembly comprising:
   a door trim panel including an interior surface and a tower projecting from the interior surface, wherein the tower includes an opening accessible by a slot, an attachment feature including a flexible arm, and a rib, and the rib is integrally molded to a surface of the flexible arm to define a single unitary component, wherein the tower includes an upper panel and walls projecting from the interior surface to the upper panel, and the upper panel includes the opening and the slot, the tower includes another rib located between and attached to the walls of the tower, the rib is located between the upper panel and the another rib, and the another rib is substantially perpendicular to the rib; and a fastener having a first base, a second base, a stem located between the first base and the second base, and a head, wherein the stem of the fastener is located in the opening, the second base is retained by the attachment feature, and the first base and the head of the fastener are located outside the tower.

8. The assembly as recited in claim 7 wherein the another rib extends from the interior surface of the door trim panel to the flexible arm, and the another rib is substantially perpendicular to the rib.

9. A seat trim, a vehicle interior component, or a vehicle exterior component comprising:

as assembly including:
 a panel including an interior surface and a tower projecting from the interior surface, wherein the tower includes an opening accessible by a slot, an attachment feature including a flexible arm, and a rib, and the rib is integrally molded to a surface of the flexible arm to define a single unitary component, and the rib is not coplanar with an end of each of the parallel walls, and
 a fastener having a first base, a second base, a stem located between the first base and the second base, and a head, wherein the stem of the fastener is located in the opening, the second base is retained by the attachment feature, and the first base and the head of the fastener are located outside the tower.

10. An assembly comprising:
a door trim panel including an interior surface and a tower projecting from the interior surface, wherein the tower includes an upper panel having an opening accessible by a slot, parallel walls projecting from the interior surface to the upper panel, an attachment feature including a flexible arm, a tab portion and an angled recess defined between the flexible arm and the tab portion, and a rib, and the rib is integrally molded to a surface of the flexible arm to define a single unitary component, and a length of the rib and a contact area of the rib with the flexible arm determines a flexibility of the flexible arm, wherein the rib is located between the parallel walls of the tower, and the rib is not coplanar with an end of each of the parallel walls; and;

a fastener having a first base, a second base, a stem located between the first base and the second base, and a head, wherein the stem of the fastener is located in the opening, the second base is retained by the tab portion of the attachment feature, and the first base and the head of the fastener are located outside the tower; and another panel attached to the head of the fastener, wherein the fastener secures the door trim panel to the another panel.

11. The assembly as recited in claim 10 wherein the tab is integrally molded to an under surface of the flexible arm.

12. The assembly as recited in claim 10 wherein the rib is located in a space defined by the parallel walls and the upper panel.

13. An assembly comprising:
a door trim panel including an interior surface and a tower projecting from the interior surface, wherein the tower includes an upper panel having an opening accessible by a slot, walls projecting from the interior surface to the upper panel, an attachment feature including a flexible arm, a tab portion and an angled recess defined between the flexible arm and the tab portion, and a rib, and the rib is integrally molded to a surface of the flexible arm to define a single unitary component, and a length of the rib and a contact area of the rib with the flexible arm determines a flexibility of the flexible arm, wherein the tower includes another rib located between and attached to the walls of the tower, the rib is located between the upper panel and the another rib, and the another rib is substantially perpendicular to the rib;

a fastener having a first base, a second base, a stem located between the first base and the second base, and a head, wherein the stem of the fastener is located in the opening, the second base is retained by the tab portion of the attachment feature, and the first base and the head of the fastener are located outside the tower; and another panel attached to the head of the fastener, wherein the fastener secures the door trim panel to the another panel.

14. The assembly as recited in claim 13 wherein the another rib extends from the interior surface of the door trim panel to the flexible arm, and the another rib is substantially perpendicular to the rib.

* * * * *